(12) United States Patent
Semper

(10) Patent No.: US 7,826,407 B2
(45) Date of Patent: Nov. 2, 2010

(54) VERSATILE SYSTEM FOR EFFICIENT VERSION CONTROL MESSAGING IN A WIRELESS RADIO ACCESS NETWORK

(75) Inventor: William Joseph Semper, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1184 days.

(21) Appl. No.: 11/325,992

(22) Filed: Jan. 5, 2006

(65) Prior Publication Data

US 2006/0227727 A1    Oct. 12, 2006

Related U.S. Application Data

(60) Provisional application No. 60/668,796, filed on Apr. 6, 2005.

(51) Int. Cl.
*H04W 4/00*    (2009.01)
(52) U.S. Cl. .......................... 370/328; 370/252; 370/335; 370/342; 455/422.1; 455/435.1; 713/2; 713/100
(58) Field of Classification Search .................. 370/252, 370/328, 335, 342, 441, 457, 463, 479, 503, 370/509, 242–245; 709/221, 222; 713/2, 713/100; 714/7, 23, 24; 455/422.1, 435.1
See application file for complete search history.

(56) References Cited

U.S. PATENT DOCUMENTS 5,761,504 A * 6/1998 Corrigan et al. ................ 713/2
2003/0012155 A1 * 1/2003 Sayeedi ........................ 370/328
2003/0031159 A1 * 2/2003 Sayeedi et al. ............... 370/342
2005/0128956 A1 * 6/2005 Hsu et al. ..................... 370/252
2005/0220069 A1 * 10/2005 Li et al. ........................ 370/349
2005/0226154 A1 * 10/2005 Julka et al. ................... 370/235

FOREIGN PATENT DOCUMENTS

KR    10-2004-0035451 A    *    4/2004

OTHER PUBLICATIONS

Baldwin et al., Interoperability Specification (IOS) for CDMA2000 Access Network Interfaces Release C-TIA-2001-C, Jul. 2003, Telecommunications Industry Association, pp. 1-12.*
3GPP2, Interoperability Specification (IOS) for CDMA2000 Access Network Interfaces—Part 7, Feb. 2005, pp. 1-9.*

* cited by examiner

*Primary Examiner*—Aung S Moe
*Assistant Examiner*—Hoon J Chung

(57) ABSTRACT

An efficient, non-redundant messaging system is disclosed that communicates version information only when an appropriate network entity (e.g., a PDSN or a PCF) is reset. The methods and constructs of the present disclosure provide a version information message for transmission between first and second entities in a network. A first information element, indicative of a first version information property of the first entity, is provided—as is a second information element indicative of a second version information property of the first entity. The first or second information element is integrated into the message and the message is sent from the first entity to the second entity only when the first entity has been reset.

26 Claims, 3 Drawing Sheets

| ALL VERSION INFORMATION MESSAGE | | | | | | | | OCTET |
|---|---|---|---|---|---|---|---|---|
| 0 | 1 | 2 | 3 | 4 | 5 | 6 | 7 | |
| ⇒ MESSAGE TYPE = [20H] | | | | | | | | 1 |
| (MSB) ⇒ RESERVED = [00 00 0H] | | | | | | | | 1 |
|  | | | | | | | | 2 |
|  | | | | | | | (LSB) | 3 |
| (MSB) ⇒ HOME ADDRESS = [00 00 00 00H] | | | | | | | | 1 |
|  | | | | | | | | 2 |
|  | | | | | | | | 3 |
|  | | | | | | | (LSB) | 4 |
| (MSB) ⇒ HOME AGENT = [IP ADDRESS OF THE PDSN] | | | | | | | | 1 |
| (ONLY INCLUDED WHEN THE MESSAGE IS SENT TO THE PCF) | | | | | | | | 2 |
|  | | | | | | | | 3 |
|  | | | | | | | (LSB) | 4 |
| (MSB) ⇒ CARE-OF-ADDRESS = [IP ADDRESS OF THE PCF] | | | | | | | | 1 |
| (ONLY INCLUDED WHEN THE MESSAGE IS SENT TO THE PDSN) | | | | | | | | 2 |
|  | | | | | | | | 3 |
|  | | | | | | | (LSB) | 4 |
| (MSB) ⇒ IDENTIFICATION = [TIME STAMP AT SENDING ENTITY] | | | | | | | | 1 |
|  | | | | | | | | 2 |
|  | | | | | | | | 3 |
|  | | | | | | | | 4 |
|  | | | | | | | | 5 |
|  | | | | | | | | 6 |
|  | | | | | | | | 7 |
|  | | | | | | | (LSB) | 8 |
| NORMAL VENDOR/ORGANIZATION SPECIFIC EXTENSION: TYPE = [86H] | | | | | | | | 1 |
| LENGTH = <ANY VALUE> | | | | | | | | 2 |
| (MSB) RESERVED = [00 00 0H] | | | | | | | | 3 |
|  | | | | | | | (LSB) | 4 |
| (MSB) 3GPP2 VENDOR ID = [00 00 15 9FH] | | | | | | | | 5 |
|  | | | | | | | | 6 |
|  | | | | | | | | 7 |
|  | | | | | | | (LSB) | 8 |
| APPLICATION TYPE = [0AH (PDSN ENABLED FEATURE), 0BH (PCF ENABLED FEATURES), 1CH (SOFTWARE VERSION)] | | | | | | | | 9 |
| IF {APPLICATION TYPE = 0AH (PDSN ENABLED FEATURES)}{1 | | | | | | | | |
| APPLICATION SUB TYPE = [01H (FLOW CONTROL ENABLED)] | | | | | | | | 10 |
| }APPLICATION TYPE = 0AH; ELSE IF (APPLICATION TYPE = 0BH (PCF ENABLED FEATURES)){1 | | | | | | | | |
| APPLICATION SUB TYPE = [SHORT DATA INDICATION SUPPORTED = 01H] | | | | | | | | 10 |
| }APPLICATION TYPE = 0BH; ELSE IF (APPLICATION TYPE = 1CH (VERSION CONTROL){1 | | | | | | | | |
| APPLICATION SUB TYPE = [01H (SOFTWARE VERSION)] | | | | | | | | 10 |
| (MSB) APPLICATION DATA = (MAJOR REVISION NUMBER) | | | | | | | | 11 |
| APPLICATION DATA = (MINOR REVISION NUMBER) | | | | | | | | 12 |
| APPLICATION DATA = (POINT REVISION NUMBER) (LSB) | | | | | | | | 13 |
| }APPLICATION TYPE = 1CH; | | | | | | | | |
| ⇒ REGISTRATION UPDATE AUTHENTICATION EXTENSION: TYPE = [28H] | | | | | | | | 1 |
| LENGTH = [14H] | | | | | | | | 2 |
| (MSB) SPI = [00 00 01 00H TO FF FF FF FFH] | | | | | | | | 3 |
|  | | | | | | | | 4 |
|  | | | | | | | | 5 |
|  | | | | | | | (LSB) | 6 |
| (MSB) AUTHENTICATOR = <ANY VALUE> (KEYED-MD-5 AUTHENTICATION) | | | | | | | | 7 |
|  | | | | | | | | 8 |
|  | | | | | | | | 9 |
| ... | | | | | | | | ... |
|  | | | | | | | (LSB) | 22 |

FIG. 2a

VERSATILE SYSTEM FOR EFFICIENT VERSION CONTROL MESSAGING IN A WIRELESS RADIO ACCESS NETWORK

CROSS-REFERENCE TO RELATED APPLICATION AND CLAIM OF PRIORITY

The present application is related to U.S. Provisional Patent No. 60/668,796, filed Apr. 6, 2005, entitled "All Version Control Messages". U.S. Provisional Patent No. 60/668,796 is assigned to the assignee of the present application and is hereby incorporated by reference into the present disclosure as if fully set forth herein. The present application hereby claims priority under 35 U.S.C. §119(e) to U.S. Provisional Patent No. 60/668,796.

TECHNICAL FIELD OF THE INVENTION

The present application relates generally to the field of wireless communications technologies and, more particularly, to structures and methods for efficiently providing version/release information among peers in a wireless radio access network.

BACKGROUND OF THE INVENTION

Increasing demand for more powerful and convenient data and information communication has resulted in the proliferation of a number of wireless communication technologies. Within the field of wireless communications, a number of industry standards and operational protocols have been developed to address the interoperability of disparate devices and equipment within a single wireless network. Many such standards and protocols provide for some basic inter-peer communication regarding device configuration and operation. Commonly, such communication is provided in the form of one or more messages passed between peers during the course of system operation.

This peer-to-peer messaging may be utilized to communicate a variety of operational information amongst members of a RAN, including information concerning equipment and software variations and revisions. As technologies and standards progress and evolve, individual components throughout a RAN may be changed or updated at irregular intervals. A single network may thus comprise a variety of components of differing ages or generations, utilizing multiple protocols, standards, or revisions thereof. One critical interoperability aspect of peer-to-peer communication, therefore, involves the sharing of information concerning the hardware or software version or revision of a given component.

Consider, for example, the general architecture and operation of a wireless Radio Access Network (RAN). Within a typical RAN, a Packet Data Serving Node (PDSN) is connected to one or more Packet Control Functions (PCFs). A messaging interface is provided between a PDSN and its associated PCFs for communicating operational information. Within a wireless RAN based upon a CDMA2000 standard (a registered trademark of the Telecommunications Industry Association, TIA-USA), for example, certain peer-to-peer communication between a PDSN and a PCF may be provided by a signaling interface (notated A11) and a bearer interface (notated A10).

Messages used on an A11 interface to setup and maintain an A10 bearer connection between peers often change with new releases of the governing standard(s). Depending upon which version or revision of the standard(s) a particular PCF/PDSN software is based upon, the corresponding PCF/PDSN interface may support different component features, or different formats for A11 signaling messages.

Under conventional protocols, unfortunately, such indication of version or revision features is communicated on a connection by connection basis. This means that version/revision information is sent each time a new A10 connection is set up—regardless of whether or not a PDSN or PCF has actually been changed or updated since last connection. Relatively, revisions or changes to a PDSN or PCF happen infrequently. Given the volume and the frequency of interconnections between a given PDSN and PCF, such an approach wastes valuable transmission bandwidth by communicating redundant version/revision information that has not changed since the last connection.

Furthermore, conventional messaging systems commonly provide only limited mechanisms for indicating information related to hardware or software features or versions. In some systems, it may be useful or necessary for one peer—a PCF, for example—to alert another peer—a PSDN—to the presence or utilization of some critical particular feature or features. Under conventional approaches, such information usually must be communicated on a feature-by-feature basis, with each such feature being related via an independent message or message block. The ability to append such information within a single message, or to subsume all such alerts within a single update, is not currently provided. Again, this results in the repeated transmission of redundant data, which reduces overall system throughput.

As a result, there is a need for a system that provides each entity in a wireless network, such as a wireless RAN, with timely messaging regarding any hardware/software revisions or changes in the peers of that entity. Such messaging should be provided in an efficient and robust manner; one that exchanges necessary or desired information only once, when one of the peers is revised, upgraded or reset—providing reliable, high-performance wireless communications in an easy and cost-effective manner.

SUMMARY OF THE INVENTION

A versatile system, comprising various constructs and methods, provides versatile and efficient version or revision messaging between entities in a wireless network—particularly a wireless RAN. The system of the present disclosure provides each entity within such a network with timely messaging regarding any revision or change in the hardware/software of the peers of the entity. This messaging system exchanges necessary or desired information only once, when one of the peers is revised, upgraded or reset.

Specifically, constructs and methods for non-redundant version/feature update messaging are disclosed. The architecture provides methods and constructs that are communicated only when an appropriate network entity (e.g., a PDSN or a PCF) is reset or rebooted—indicating either a change or update of hardware or software of the entity. Two message segments are integrated within incumbent messaging or signaling frameworks to indicate capabilities of a PCF or PDSN, as well as well as the standard or protocol version that each is supporting.

More specifically, the system of the present disclosure provides an efficient, non-redundant messaging system that communicates version information only when an appropriate network entity (e.g., a PDSN or a PCF) is reset. Various methods and constructs provide a version information message for transmission between first and second entities in a network. A first information element, indicative of a first version information property of the first entity, is provided— as is a second information element indicative of a second version information property of the first entity. The first or second information element is integrated into the message and the message is sent from the first entity to the second entity only when the first entity has been reset.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the terms "construct", "function", "element" or "component" mean any device, system or part thereof that controls or performs at least one operation, and may be implemented in hardware, firmware or software, or some combination of at least two of the same. It should be noted that the functionality associated with any particular construct or element may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2a illustrates one embodiment of message structure in accordance with the present disclosure.

DETAILED DESCRIPTION OF THE INVENTION

Figure 1:
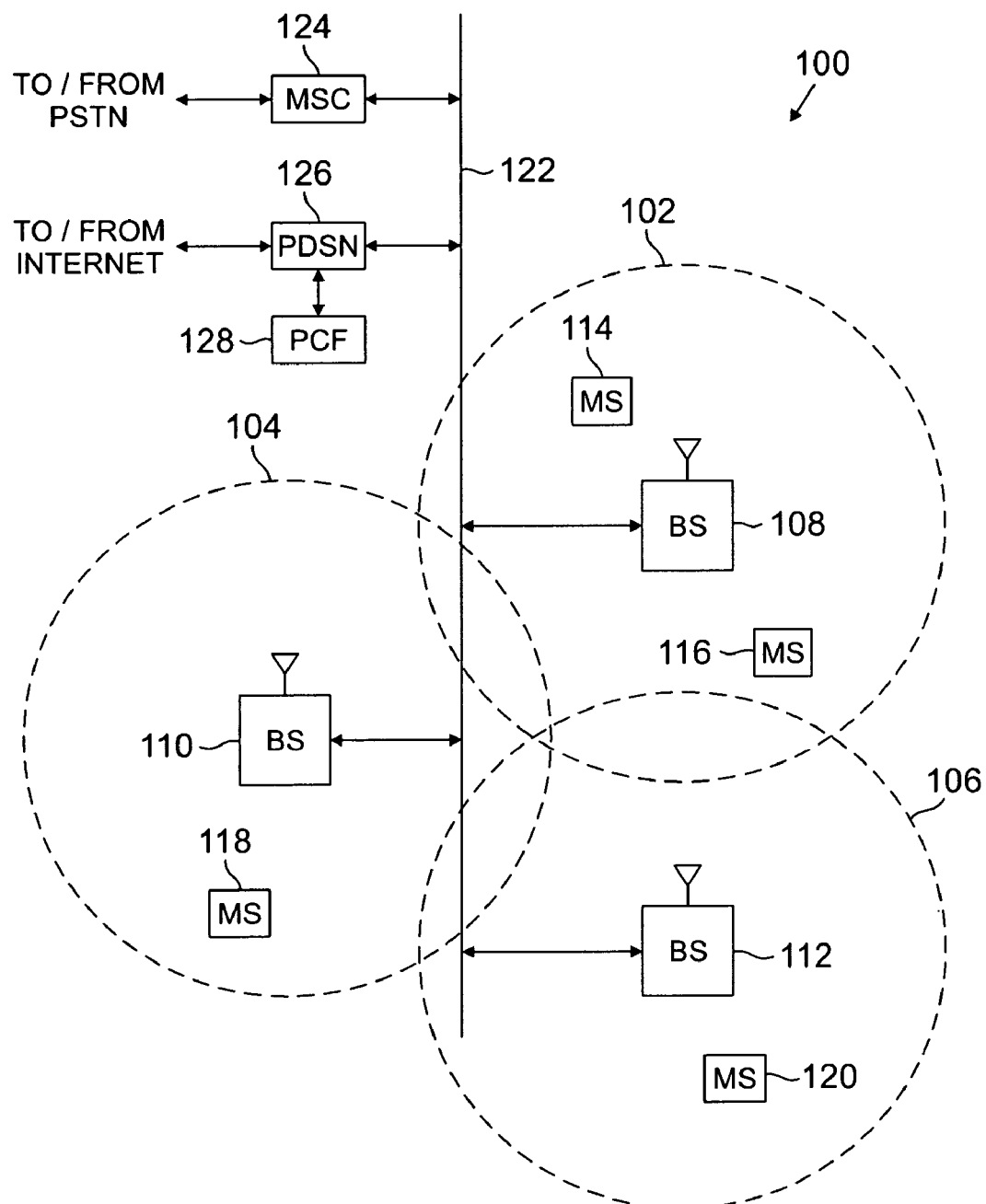
FIG. 1 illustrates one embodiment of wireless communications system in accordance with the present disclosure.
Figure 2B:
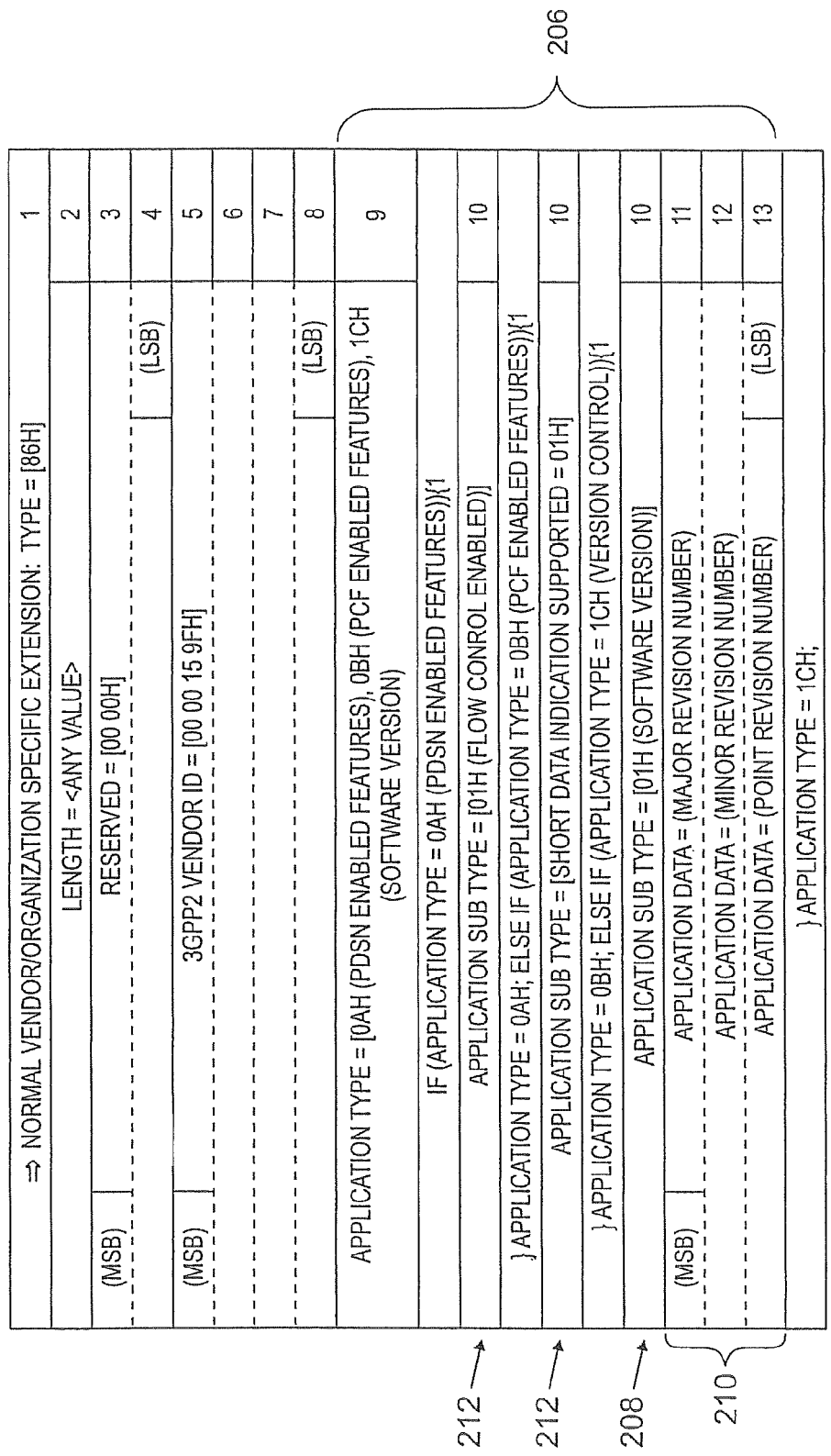
FIG. 2b illustrates one embodiment of a message information element in accordance with the present disclosure.

FIGS. 1 through 2b, discussed below, and the various embodiments used to describe the principles of the present disclosure in this patent document are by way of illustration only and should not be construed in any way to limit the scope of the disclosure. Hereinafter, certain aspects of the present disclosure are described in relation to illustrative structures, operations, protocols and standards—such as CDMA2000, TIA-2001-C, Interoperability Standards (IOS), and other related structures and processes. Those skilled in the art, however, will understand that the principles and teachings of the present disclosure may be implemented in any suitably arranged wireless radio access network.

The following discloses a versatile system—comprising various constructs and methods—that provides versatile and efficient version, revision or feature messaging between entities in a wireless network—particularly a wireless RAN. The system of the present disclosure provides each entity within such a network with timely notification of any revisions or changes in the hardware or software of a peer device. This messaging system exchanges such information only once, when an entity is reset, revised or upgraded.

Specifically, constructs and methods for non-redundant version/feature update messaging are disclosed. For ease of reference throughout this disclosure, the term "version information" may hereafter be used to generally denote any information concerning updates, upgrades, changes, revisions, replacements or reinstallations pertaining to any hardware, software or firmware component or element of interest within a given system. The system of the present disclosure provides methods and constructs that communicate version information only when an appropriate network entity (e.g., a PDSN or a PCF) is reset or rebooted. Two message segments are provided and integrated within incumbent messaging or signaling frameworks to indicate features or capabilities of a PCF or PDSN, as well as the standard or protocol version that each currently supports.

It should be noted that, depending upon the features of a RAN's incumbent messaging or signaling system, different embodiments of the system of the present disclosure may be provided. The exact form of these embodiments will vary, depending upon the ability of the messaging/signaling system to distinguish between instances when an entity is reset or rebooted with changes or updates, and when the entity is reset or rebooted without changes or updates (e.g., power supply failure). To the extent that an incumbent messaging/signaling system is able to so signal, embodiments of the present disclosure may be configured to withhold the version information message segments where reset or reboot has occurred without changes or updates. For purposes of explanation and illustration, however, the embodiments illustrated and described hereinafter assume that: any time an entity's hardware or software is changed or updated, the entity is reset or rebooted; and the incumbent messaging/signaling system does not have the capability to distinguish whether an entity has been reset or rebooted with or without changes or updates. The embodiments described and illustrated hereinafter, therefore, include the version information message segments each time an entity reset or reboot occurs.

For purposes of illustration and explanation, FIG. 1 illustrates a general wireless network 100 that is suitable for version information messaging or signaling according to certain aspects of the present disclosure. In the illustrated embodiment, network 100 comprises a plurality of cells (or cell sites) 102-106, each containing a base station, BS 108, BS 110, or BS 112, respectively. Base stations 108-112 communicate with a plurality of mobile stations (MS) 114-120 over code division multiple access (CDMA) channels according to a desired standard (e.g., IS-2000/CDMA2000, IS-2001). In certain embodiments of the present disclosure, mobile stations 114-120 are capable of receiving data traffic and/or voice traffic on two or more CDMA channels simultaneously. Mobile stations 114-120 may be any suitable wireless devices (e.g., conventional cell phones, PCS handsets, personal digital assistant (PDA) handsets, portable computers, telemetry devices) that are capable of communicating with base stations 108-112 via wireless links.

The present disclosure is not limited to mobile devices. The present disclosure also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cells (or cell sites) 102-106 in which base stations 108-112 are located.

It is noted that the terms "cells" and "cell sites" may be used interchangeably in common practice. For simplicity, the term "cell" will be used hereafter. The cells are shown approximately circular for the purposes of illustration and explanation only. It should be clearly understood that the cells may have other irregular shapes, depending on the cell configuration selected and variations in the radio environment associated with natural and man-made obstructions.

Each of cells 102-106 is comprised of a plurality of sectors, where a directional antenna coupled to the respective base station illuminates each sector. The embodiment of FIG. 1 illustrates the base station in the center of the cell. Alternate embodiments may position the directional antennas in corners of the sectors. The system of the present disclosure is not limited to any particular cell configuration.

In one embodiment of the present disclosure, each of BS 108, BS 110 and BS 112 comprises a base station controller (BSC) and one or more base transceiver subsystem(s) (BTS). A base station controller is a device that manages wireless communications resources, including the base transceiver subsystems, for specified cells within a wireless communications network. A base transceiver subsystem comprises the RF transceivers, antennas, and other electrical equipment located in each cell. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 102-106, and the base station controller associated with each base transceiver subsystem, are collectively represented by BS 108, BS 110 and BS 112, respectively.

BS 108-112 transfer voice and data signals between each other and the public switched telephone network (PSTN) (not shown) via communication line 122 and mobile switching center (MSC) 124. BS 108-112 also transfer data signals, such as packet data, with the Internet (not shown) via communication line 122 and packet data server node (PDSN) 126. Packet control function (PCF) unit 128 controls the flow of data packets between base stations 108-112 and PDSN 126. PCF unit 128 may be implemented as part of PDSN 126, as part of MSC 124, or as a stand-alone device that communicates with PDSN 126, as shown in FIG. 1. Line 122 also provides the connection path for control signals transmitted between MSC 124 and BS 108-112 that establish connections for voice and data circuits between MSC 124 and BS 108-112.

Communication line 122 may be any suitable connection means, including a T1 line, a T3 line, a fiber optic link, a network packet data backbone connection, or any other type of data connection. Alternatively, communication line 122 may be replaced by a wireless backhaul system, such as microwave transceivers. Communication line 122 links each vocoder in the BSC with switch elements in MSC 124. The connections on communication line 122 may transmit analog voice signals or digital voice signals in pulse code modulated (PCM) format, Internet Protocol (IP) format, asynchronous transfer mode (ATM) format, or the like.

As noted above, and previously, a PDSN may be connected to one or more PCFs, with an appropriate messaging or signaling interface provided therebetween for communicating operational information. For purposes of explanation and illustration, PDSN/PCF communication in system 100 may be provided by an incumbent signaling interface (A11) and bearer interface (A10) of the type defined in 3GPP2 A.S0017-C, Interoperability Specification (IOS) for cdma2000 Access Network Interfaces—Part7 (A10 and A11 Interfaces), February 2005; which is a supplement to the TIA-2001-C standard. Those specifications and standards are hereby incorporated by reference, and may hereafter be referred to as the incumbent messaging system.

Under the incumbent messaging system, a PCF may initiate setup of an A10 connection by sending an appropriate A11 request message to a selected PDSN. The selected PDSN may respond with an appropriate reply message establishing an A10 connection. Thereafter, either entity may refresh or update session parameters of an A10 connection by sending some form of refresh/update message to the other. Each such message may comprise a number of required or optional information elements that may be pre-defined or left open for application-specific definition.

The messages that are used on an A11 interface to setup and maintain A10 bearer connections often change with new releases of the messaging system's governing standards. Depending upon which version of the standards a particular PCF or PDSN's software is based upon, those entities may support different operational features and different A11 message formats.

Although—depending upon the specific system and IOS operating parameters—the message segments of the present disclosure may be provided within the context of any appropriate initiation or update message or signal, preferred embodiments of the present disclosure provide version information message segments that are used only when either a PDSN or PCF is reset or rebooted (i.e., initiation). These version information message segments comprise elements that convey features and capabilities of a PCF or PDSN, as well as the version of the governing standard that each supports.

This is illustrated and described in greater detail with reference now to FIGS. 2a and 2b, which illustratively depict one embodiment of a version information message structure 200 according to the present disclosure. In FIG. 2a, message 200 comprises a number of differing message elements 202—some or most of which may be required in each transmission of message 200, and other that may be optional. Amongst the message elements, a version information element 204 is provided. Information element 204 is depicted and described in greater detail with reference to FIG. 2b.

Amongst the information provided in information element 204, a version information segment 206 is provided. The two version information elements of the present invention may be provided within segment 206. In the embodiment shown, segment 206 may comprise a version information element 208 that conveys information regarding the IOS standard or protocol version that a sending entity is operating with. Depending upon the specific provisions of the incumbent messaging system, element 208 may comprise, for example, an octet that is supported or supplemented by one or more supporting sub-elements (e.g., octets) 210. As indicated in FIG. 2b, such additional octets or sub-elements may be provided to indicate varying levels of revision information.

Again depending upon the upon the specific provisions of the incumbent messaging system, segment 206 may comprise—in place of or in addition to element 208 and sub-elements 210—one or more capability/feature information element(s) 212. Element(s) 212 convey information about operational or functional features or capabilities supported by the sending entity. For example, element 212 may contain information about the features supported by a sending PCF (e.g., Short Data Indication), or a sending PDSN (e.g., Flow Control).

Once either or both of the information elements 208 or 212 have been transmitted to a receiving entity, segment 206 may be abbreviated or omitted from future A11 transmissions sent from the entity, until that entity is reset or rebooted. Once a receiving entity has received information in segment 206, it may maintain and associate that information with the sending entity until a new segment 206 is received from the entity. Repetitive provision of such information associated with conventional systems is obviated, as is the repetitive transmission of entire messages to communicate multiple entity features or capabilities.

For example, if an entity in a conventional system had to communicate several critical features or capabilities, it would—in most cases—have to send separate instances of an entire message 200 to do so. In contrast, using the present disclosure, a single transmission of a message 200 may be utilized to convey all desired information—having either multiple instances of element 204, segment 206, or elements 208-212, depending upon the limitations or restrictions of an incumbent messaging system. In alternative embodiments, segment 206 as a whole, or each or both of elements 208-212, may be provided in different or independent message elements as conditions require.

The constructs and methods of the present system thus provide efficient version, revision or feature messaging between entities in a wireless network. Such information is exchange only once, and is provided in a format that may be easily integrated within an incumbent messaging system. Two independent message elements are provided to indicate features or capabilities of a PCF or PDSN, as well as the standard or protocol version that each currently supports.

Although certain aspects of the present disclosure have been described in relations to specific systems, standards and structures, it should be easily appreciated by one of skill in the art that the system of the present disclosure provides and comprehends a wide array of variations and combinations easily adapted to a number of wireless communications system. As described herein, the relative arrangement and operation of necessary functions may be provided in any manner suitable for a particular application. All such variations and modifications are hereby comprehended. It should also be appreciated that the constituent members or components of this system may be produced or provided using any suitable hardware, firmware, software, or combination(s) thereof.

The embodiments and examples set forth herein are therefore presented to best explain the present invention and its practical application, and to thereby enable those skilled in the art to make and utilize the system of the present disclosure. The description as set forth herein is therefore not intended to be exhaustive or to limit any invention to a precise form disclosed. As stated throughout, many modifications and variations are possible in light of the above teaching without departing from the spirit and scope of the following claims.

What is claimed is:

1. A method of communicating version information between a first data packet control device and a second data packet control device within a wireless communications network, the method comprising the steps of:
   providing a message for transmission between the first data packet control device and the second data packet control device;
   providing a first information element indicative of a first version information property of the first data packet control device;
   providing a second information element indicative of a second version information property of the first data packet control device; and
   integrating the first information element or the second information element into the message and sending the message from the first data packet control device, via an A10/A11 based messaging interface, to the second data packet control device only when the first data packet control device has been reset.

2. The method of claim 1, wherein a messaging system is based on a TIA-2001-C standard.

3. The method of claim 1, wherein the first data packet control device is a packet control function.

4. The method of claim 1, wherein the first data packet control device is a packet data serving node.

5. The method of claim 1, wherein the step of integrating the first information element or the second information element into the message further comprises integrating only the first information element.

6. The method of claim 1, wherein the step of integrating the first information element or the second information element into the message further comprises integrating only the second information element.

7. The method of claim 1, wherein the step of integrating the first information element or the second information element into the message further comprises integrating both the first information element and the second information element.

8. The method of claim 1, wherein the step of providing the first information element further comprises providing an information element conveying information regarding an interoperability standard version that the first data packet control device is operating with.

9. The method of claim 8, wherein the step of providing the first information element further comprises providing one or more sub-elements that indicate varying levels of revision information.

10. The method of claim 1, wherein the step of providing the second information element further comprises providing an information element conveying a Short Data Indication.

11. The method of claim 1, wherein the step of providing the second information element further comprises providing an information element conveying a Flow Control indication.

12. A wireless radio access system capable of communicating updated version information between a packet control function and a packet data serving node within a wireless communications network, the wireless radio access system comprising:
   the packet control function;
   the packet data serving node; and
   a messaging interface between the packet control function and the packet data serving node;
   wherein a message containing the updated version information is initiated between the packet control function and the packet data serving node only when either the packet control function or the packet data serving node is reset,
   wherein the messaging interface is an A10/A11 based interface, and a first information element and a second information element are provided,
   wherein the updated version information includes the first information element or the second information element, the first information element indicative of a first version information property of the packet control function or the packet data serving node, and the second information element indicative of a second version information property of the packet control function or the packet data serving node.

13. The wireless radio access system of claim 12, wherein the wireless radio access system is a CDMA2000 system.

14. The wireless radio access system of claim 12, wherein the messaging interface is of a type defined in 3GPP2 A.S0017-C, Part 7.

15. The wireless radio access system of claim 12, wherein the message containing the updated version information further comprises an information element conveying information regarding an interoperability standard version.

16. The wireless radio access system of claim 15, wherein the message containing the updated version information further comprises one or more sub-elements that indicate varying levels of revision information.

17. The wireless radio access system of claim 12, wherein the message containing the updated version information further comprises an information element conveying a Short Data Indication.

18. The wireless radio access system of claim 12, wherein the message containing the updated version information further comprises an information element conveying a Flow Control indication.

19. A method of communicating updated version information between a packet control function and a packet data serving node in a wireless radio access network, the method comprising the steps of:
providing a version information message for transmission between the packet control function and the packet data serving node;
providing a first information element indicative of an interoperability standard revision information for either the packet control function or the packet data serving node;
providing a second information element indicative of an operational property of the packet control function;
providing a third information element indicative of an operational property of the packet data serving node; and
integrating the first information element, the second information element or the third information element into the version information message and sending the version information message between the packet control function and the packet data serving node, via an A10/A11 based messaging interface, only when either the packet control function or the packet data serving node has been reset.

20. The method of claim 19, wherein the step of providing the first information element indicative of an interoperability standard revision information further comprises providing a plurality of sub-elements that indicate varying levels of revision information.

21. The method of claim 19, wherein the step of providing the version information message further comprises providing a message version information message based on a TIA-2001-C standard.

22. The method of claim 19, wherein the step of integrating the first information element, the second information element or the third information element into the version information message and sending the version information message further comprises integrating only the first information element.

23. The method of claim 19, wherein the step of integrating the first information element, the second information element or the third information element into the version information message and sending the version information message further comprises integrating only the first information element and the second information element.

24. The method of claim 19, wherein the step of integrating the first information element, the second information element or the third information element into the version information message and sending the version information message further comprises integrating only the first information element and the third information element.

25. The method of claim 19, wherein the step of integrating the first information element, the second information element or the third information element into the version information message and sending the version information message further comprises integrating multiple instances of the first information element.

26. The method of claim 19, wherein the step of integrating the first information element, the second information element or the third information element into the version information message and sending the version information message further comprises integrating multiple instances of the second information element or multiple instances of the third information element.

* * * * *